Dec. 28, 1937.   D. M. SMITH   2,103,664
PISTON EXPANDER
Filed March 25, 1937
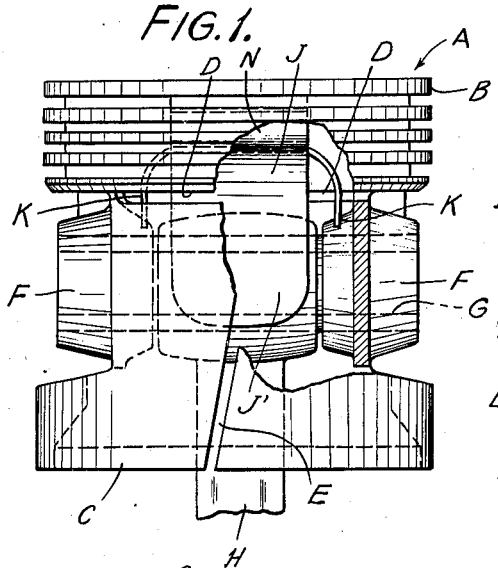
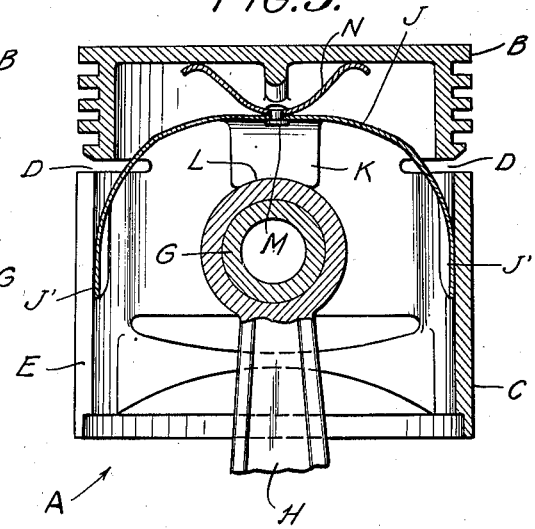
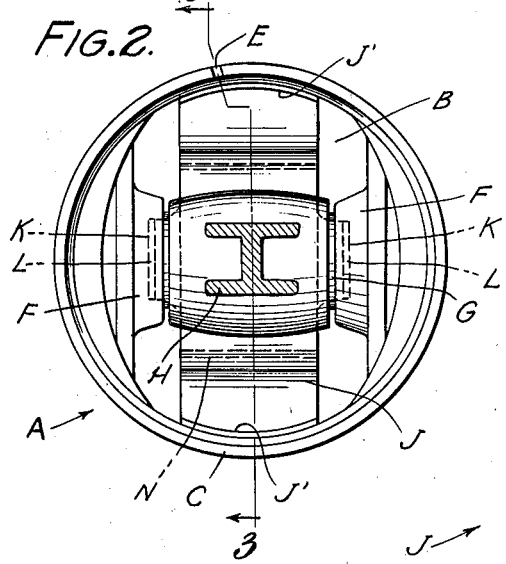
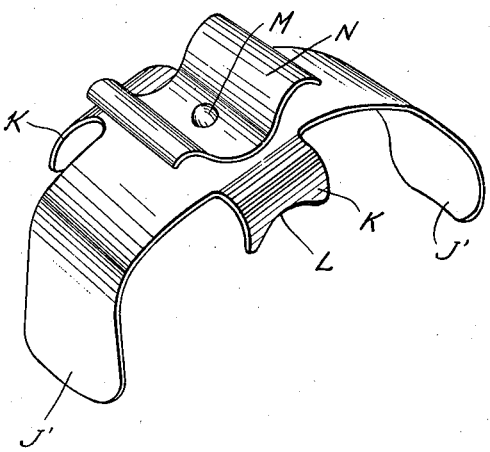
INVENTOR:
DALLAS M. SMITH,
BY Henry Kinealy
ATTORNEY.

Patented Dec. 28, 1937

2,103,664

UNITED STATES PATENT OFFICE 2,103,664

PISTON EXPANDER

Dallas M. Smith, Kirkwood, Mo.

Application March 25, 1937, Serial No. 133,053

6 Claims. (Cl. 309—12)

My invention relates to piston expanders and more particularly to piston expanders as used in internal combustion engines to increase the effective diameter of the piston skirt whereby compensation may be made for wear between the piston and the cylinder in which it reciprocates.

Heretofore, although it has been comparatively simple to insert a resilient or spring member in the piston to increase the diameter of the skirt, it has been difficult to provide means whereby the expander would be maintained in fixed predetermined position during operation of the motor. The piston skirts as now used are in reality resilient split bands and the forces generated by the extremely rapid movement of the piston in the cylinder often cause the skirt to go into a flutter or tuned vibration. Since the expander is acting upon the skirt, it also may vibrate at a high frequency and, therefore, unless the expander is securely anchored to the piston it may become dislodged from its position therein and drop into the moving parts of the motor.

With this problem in mind the objects of my invention are to provide a piston expander which includes parts whereby the expander may be anchored securely inside of the piston and to provide a piston expander which will be simple in design, cheap to manufacture and efficient in operation.

My invention in its broadest aspect contemplates the use of an expander having a member arranged to engage and expand the piston skirt, and, also, having parts engaging the interior of the piston, preferably, in the pin bosses, and provided with a spring adapted to create a tension to hold the parts securely in place.

A simple embodiment of the expander embodying this invention is shown in the accompanying drawing wherein similar characters are used to designate similar parts. In the drawing, Fig. 1 is a view of a piston, partially broken away, and its included expander made according to my new and improved design; Fig. 2 is a bottom view of the assembly shown in Fig. 1; Fig. 3 is a section along the line 3—3 in Fig. 2; and Fig. 4 is a view of the expander removed from the piston.

Referring to the figures the piston A on which the expander is assembled has a head B and a skirt C separated therefrom throughout a major portion of its periphery by circumferentially extending slots D. The skirt C also is split axially as at E so that in effect the skirt is a resilient, split band. The piston is provided with bosses F of usual design and through which extend a wrist pin G on which is mounted the upper end of the connecting rod H.

In this embodiment the expander proper consists of a U-shaped member J having flat ends J' adapted to engage the inner surface of the piston skirt at diametrically opposed points removed approximately ninety degrees from the bosses F, as shown in Fig. 3. The member J is formed and arranged so that the upper portion thereof extends above the pin G and the upper end of the connecting rod H. Extending downwardly from the upper portion of the member J and, preferably, formed integral therewith are a pair of parts K each having its lower end arranged with an arcuate shaped notch L adapted to engage the upper surface of a boss F. Extending upwardly from the member J and secured thereto by any suitable expedient, as by a rivet M, is a spring N arranged to engage, in this embodiment, the inner surface of the top of the piston and to create a tension to force the lower ends of the parts K firmly against the pin bosses so that the expander will be maintained in place securely within the piston.

As implied above, the portion of the expander comprising the member J and parts K, preferably, is stamped as a single piece of spring steel of proper gauge and hardness. The tension spring N may be a separate piece, as shown in this embodiment, or in other embodiments tongues may be stamped out of the member J and bent upwardly to form the spring. Also, of course, the parts K may be positioned and adapted to engage knobs formed on the piston skirt or other protuberances on the inner surfaces of the piston. In any event, the spring N will hold the lower ends of the parts K firmly in their place of engagement.

When the expander in the embodiment shown is to be inserted in place in the interior of a piston the skirt engaging ends J' of the member J preferably are tied together by a wire or held in collapsed position by other suitable expedient and the expander is inserted upwardly in the piston from the open bottom of the skirt. When the parts K come into engagement with the pin bosses movement of the expander into the piston will collapse these parts and then when the lower ends L of the parts have moved past the inner faces of the bosses the parts will spring outwardly so that the ends will engage the upper portions of the bosses, as shown in Fig. 1. As stated before, firm engagement between the ends L and the bosses will be maintained by tension of the spring N.

I have shown and described a simple embodiment of my invention in the specification and drawing herein, however, I do not propose to limit myself to the form shown or to any other form because construction of an expander embodying my new and improved design may be varied in size, shape and arrangement of the various parts and their relation to one another may be changed within wide limits without deviating from the ambit of the appended claims.

What I claim as new and desire to secure by Letters Patent, is:—

1. A piston expander comprising a member arranged to engage and expand the skirt of a piston, a pair of additional parts carried by said member and positioned to engage interior portions of the piston at opposed points and a spring carried by said expander to engage the head of said piston and to exert a tension to hold said parts firmly at their place of engagement.

2. A piston expander comprising a U-shaped member having a pair of legs adapted to engage and expand the skirt of a piston at substantially diametrically opposed points, a pair of additional parts carried by said member at the top thereof and positioned to engage interior portions of the piston, and a spring carried by said member to engage the head of said piston to exert a tension to hold said parts firmly at their place of engagement.

3. A piston expander comprising a member arranged to engage and expand the skirt of said piston, a pair of parts carried by said member and positioned to engage the upper surfaces of the pin bosses of said piston and spring means carried by said expander to engage the top of said piston and exert a tension to hold said parts in firm engagement with said pin bosses.

4. A piston expander comprising a member arranged to engage and expand the skirt of said piston, a pair of resilient parts formed and positioned to engage the upper surfaces of the pin bosses of said piston and spring means carried by said expander to engage the head of said piston whereby said parts will be held in firm engagement with said pin bosses.

5. A piston expander comprising a U-shaped member arranged to engage and expand the skirt of a piston at substantially diametrically opposed points, said member extending across the hollow interior of the piston above the pin bosses thereof, a pair of parts carried by said member and positioned to engage the upper surfaces of said pin bosses, and a spring extending upwardly from said member to engage the head of said piston and exert a tension to hold said parts in firm engagement with said pin bosses.

6. A piston expander comprising a U-shaped member arranged to engage and expand the skirt of a piston at substantially diametrically opposed points, said member extending across the hollow interior of the piston above the pin bosses thereof, a pair of parts formed integral with said member and extending downwardly from the upper portion thereof and positioned so that the lower end of each of said parts engages the upper surfaces of one of said pin bosses, and a spring extending upwardly from said member to engage the head of said piston and exert a tension to hold the lower ends of said parts in firm engagement with said pin bosses.

DALLAS M. SMITH.